United States Patent [19]
Daniel

[11] 4,010,413
[45] Mar. 1, 1977

[54] PLURAL FREQUENCY GEOLOGICAL EXPLORATION SYSTEM AND METHOD WITH PHASE COMPARISON

[75] Inventor: Donald B. Daniel, Northridge, Calif.
[73] Assignee: Geo-Nav, Inc., Oklahoma City, Okla.
[22] Filed: Mar. 7, 1975
[21] Appl. No.: 556,252

Related U.S. Application Data

[63] Continuation of Ser. No. 173,937, Aug. 23, 1971, abandoned.

[52] U.S. Cl. .................................................. 324/6
[51] Int. Cl.² ......................................... G01V 3/12
[58] Field of Search ............................... 324/3, 4, 6

[56] References Cited

UNITED STATES PATENTS

| | | | |
|---|---|---|---|
| 1,718,352 | 6/1929 | Guilford | 324/6 |
| 1,820,953 | 9/1931 | Sundberg et al. | 324/6 |
| 2,268,106 | 12/1941 | Blau | 324/6 |
| 2,426,918 | 9/1947 | Barret | 324/6 |
| 2,623,924 | 12/1952 | Cartier et al. | 324/6 X |
| 2,642,477 | 6/1953 | Puranen et al. | 324/6 |
| 2,900,595 | 8/1959 | Mengel et al. | 324/6 |
| 2,903,642 | 9/1959 | Seigel | 324/6 |
| 2,929,984 | 3/1960 | Puranen et al. | 324/6 |
| 2,955,250 | 10/1960 | Shaw et al. | 324/6 X |
| 2,966,627 | 12/1960 | Hawkins | 324/6 X |
| 3,123,767 | 3/1964 | Ghose | 324/6 |

*Primary Examiner*—Gerard R. Strecker
*Attorney, Agent, or Firm*—Nilsson, Robbins, Dalgarn & Berliner

[57] ABSTRACT

A system is disclosed for investigating subterranean formations by analyzing the propagation of low-frequency radio transmissions. Commensurate signals of different frequencies are received from a transmitting station and are processed into a phase-comparable form. The phase-comparable signals are then compared in phase to provide a representative signal indicative of a subterranean formation. A system utilizing at least three transmitted signals is disclosed to provide specific information related to the depth of formations. A system utilizing signals from a plurality of transmitting stations is disclosed to afford improved formation illumination. Also, a mobile form of the system is disclosed which incorporates a position-information system for combined use.

10 Claims, 5 Drawing Figures

INVENTOR.
DONALD B. DANIEL
BY HIS ATTORNEYS,
NILSSON, ROBBINS, WILLS & BERLINER.

PLURAL FREQUENCY GEOLOGICAL EXPLORATION SYSTEM AND METHOD WITH PHASE COMPARISON

This is a continuation of application Ser. No. 173,937, filed Aug. 23, 1971, now abandoned.

BACKGROUND AND SUMMARY OF THE INVENTION

It has been previously proposed to investigate subterranean formations in situ by observing the propagation of radio signals. Generally, a variety of different processes and apparatus have been proposed; however, although considerable worthwhile data has been provided, a need continues to exist for an effective system having improved accuracy and relative economy.

In general, the present system employs radio signals of low frequency that are broadcast from one or more transmitter locations. For example, commensurate signals of different frequencies are transmitted from a single location to a receiver that is located above a formation of interest. At each point along the path of the wave, part of the energy enters the earth and propagates in a direction almost vertically downward. Such radio energy is reflected from the formation, as upon encountering an impedance discontinuity. Accordingly, energy returns to the surface, to be sensed by a receiver.

Signals of longer wavelength (lower frequency) penetrate deeper into the formation than the shorter wavelength (higher frequency) signals. Accordingly, different paths are traveled by signals of different frequency and, accordingly, manifest phase variations at the radio receiver. The received signals are reduced to a phase-comparable form and phase detected to provide indications of the subterranean formation. In utilizing three or more different-frequency signals, considerably-improved depth-related data is provided. By employing signals from a plurality of locations, improved illumination of the formation results in more-significant data.

BRIEF DESCRIPTION OF THE DRAWINGS

In the drawings, which constitute a part of this specification, exemplary embodiments demonstrating various objectives and features hereof are set forth, specifically.

DESCRIPTION OF THE ILLUSTRATIVE EMBODIMENTS

As required, detailed illustrative embodiments of the invention are disclosed herein. The embodiments exemplify the invention, which may be embodied in various other forms, some of which may be radically different from those disclosed herein. However, the specific structural and functional details disclosed herein are representative and provide a basis for the claims herein which define the scope of this invention.

Figure 1:
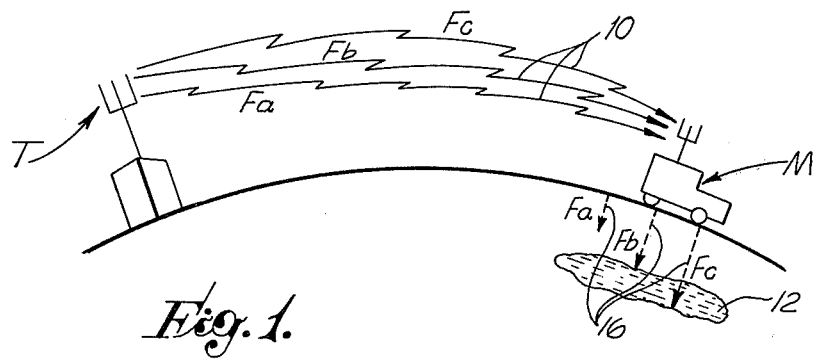
FIG. 1 is a symbolic representation illustrative of the system of the present invention.

Referring initially to FIG. 1, there is shown a transmitting station T from which three distinct radio signals (Fa, Fb, and Fc) are transmitted. These signals are merely illustrative for purposes of explanation and, as will be disclosed in detail below, various numbers of signals may be utilized, and may be transmitted from various numbers of transmitters.

In general, the signals Fa, Fb, and Fc are of different frequency; however, are phase commensurate. That is, the signals are provided in phase-locked relationship and may, accordingly, be phase compared (after being translated to a common frequency) to provide meaningful intelligence.

As represented in FIG. 1, ground-wave signals Fa, Fb, and Fc are sensed by a mobile unit M. However, in addition to receiving the ground-wave signals (represented by lines 10), the receiver in the mobile unit M may also receive reflections from the formation under investigation. That is, at each point along the path between the transmitter station T and the formation of interest 12, a portion of the radio energy enters the earth 14. Those portions of the radio energy which enter the earth 14 above the formation 12 are represented by vectors 16.

As indicated above, the depths to which radio energy penetrates the earth is inversely proportional to the square root of the frequency of the wave. For example, assuming the signals Fa, Fb, and Fc to be of decreasing orders of frequency, energy of the signal Fc (lowest frequency) will penetrate the earth 14 to the greatest depth. The energy of signal Fa (highest frequency) is least penetrating and the signal Fb (intermediate frequency) attains intermediate penetration. As shown in FIG. 1, the vectors 16 indicate representative penetrations for each of the signals Fa, Fb, and Fc.

In order to explain the theory of operation for the present system, a somewhat-idealized situation will be assumed. Specifically, assume that the portion of the signal Fa penetrating the earth 14 toward the formation of interest 12 encounters no discontinuities and, accordingly, provides no reflections. Accordingly, the receiver in the mobile unit M receives the ground-wave signal represented by one of the lines 10, which is represented by the vector Fa in FIG. 2(A).

Assume further that the signal Fb (lower frequency) by reason of its greater depth of penetration, provides echos from the formation 12. Consequently, the receiver of the mobile unit M receives a signal component represented by the vector 20 (FIG. 2(B)) indicative of the ground-wave signal and a reflected signal represented by the vector 22. By reason of the longer path traveled by the signal component represented by the vector 22, substantial phase displacement exists between the signal components represented by the vectors 20 and 22. Of course, the observed signal at the mobile unit M is the summation of the signals Fb, and accordingly is represented by the sum of the vectors 20 and 22, i.e. vector 24.

Assume further that the component of the signal Fc, which penetrates the formation 12, encounters additional reflecting formations to provide two phase-displaced signal components represented by the vectors 26 and 28, in addition to the signal represented by the vector 30 which, as previously described, represents the ground-wave signal. The signal Fc as sensed by the mobile unit M consists of components represented by the vectors 26, 28 and 30, and is represented by a vector 32 as indicated in FIG. 2(C).

Recapitulating, it may be seen that as a result of the transmission of signals of three frequencies above an assumed formation whereby: essentially no earth reflections of the signal Fa occur, some earth reflections result from the signal Fb and more reflections result from the signal Fc, the three signals Fa, Fb, and Fc minifest different phase displacements. Specifically, the signal Fa may be considered a reference as indicated in FIG. 2(A). The signal Fb (represented by the vector 24) is substantially phase-displaced from the signal Fa, and the signal Fc (represented by the vector 32) is additionally phase displaced. The phase displacement of the signals, as indicated above, is related to the energy's penetration of the earth, as to be reflected by resistivity and other discontinuities. That is, impedance discontinuities provide reflections or echos which are sensed and which result in phase displacement. Accordingly, by judiciously selecting phase coherent signals at various frequencies and in various numbers, subterranean formations may be analytically probed.

Figure 2:
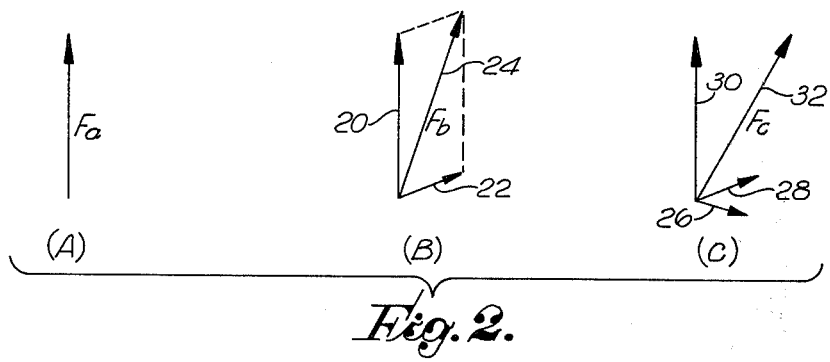
FIG. 2 shows vector diagrams which are employed in explaining the operation of the system hereof.

From the above consideration with reference to FIGS. 1 and 2, it may be seen that comparative phase shift between radiated signals (of different frequencies) will indicate reflecting zones in geological formations. Accordingly, to practice the system, the three signals Fa, Fb, and Fc as observed at the mobile unit M (FIG. 1) may be converted to a single common frequency then phase compared to provide information indicative of earth-reflected energy. As such energy indicates impedance discontinuities, the resulting information is indicative of the content of the formation. That is, the information provided with relation to discontinuities may be interpreted by a skilled geologist or geophysicist to predict the formation content, e.g. as mineral bearing and so on. Furthermore, data representative of formation reflections may be variously presented as in the form of "signatures", e.g. curves or other plots, which may be associated to identify different formations.

Figure 3:
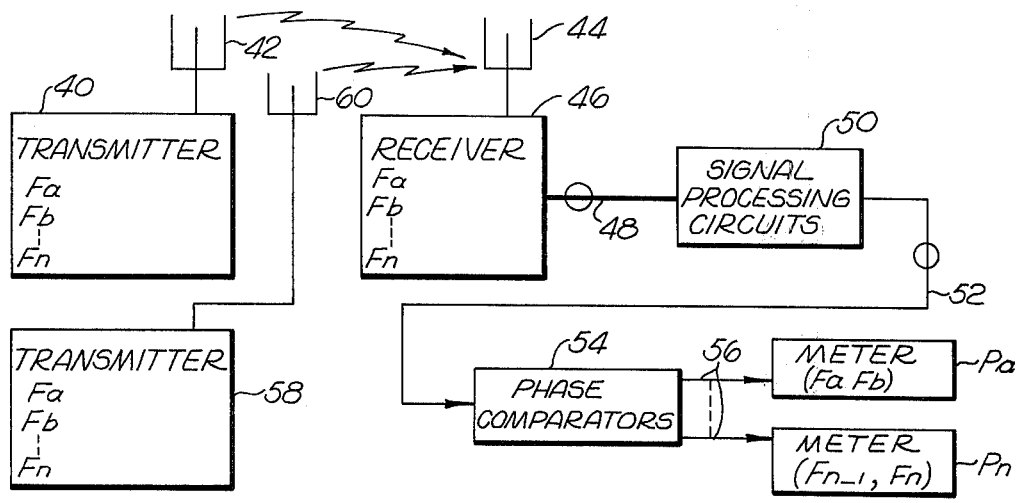
FIG. 3 is a block diagram of a system constructed in accordance with the present invention.

Considering an illustrative system, reference will now be had to FIG. 3. A transmitter 40 is provided for radiating signals Fa, Fb - - Fn, of a plurality of frequencies from an antenna 42. Although various numbers of signals of different frequencies are radiated, the signals are phase coherent or commensurate at the point of transmission whereby each is functionally phase locked to the other. Also, in accordance with the present system, generally it has been determined that the radiated signals should be below 450 KH. For example, the system might transmit signals of four distinct frequencies that are referenced to a base frequency of 14.5 KH. Specifically, the frequencies may be the multiples of the base frequency, of: five, six, eight, and nine.

Energy transmitted from the antenna 42 is received by an antenna 44 in cooperation with a broad-band receiver 46. The receiver 46 incorporates filter circuits or the like, as will be described in detail below, for providing the separate signals Fa, Fb - - Fn through a cable 48 to signal-processing circuits 50. The function of the signal-processing circuits 50 is to provide the signals Fa, Fb - - Fn in a form in which pairs of such signals may be phase compared. For example, the signals may be stored, multiplied, divided, or otherwise processed to provide pairs of usable signals for phase comparison.

It will be apparent that the nature of the signal-processing circuits 50 will depend upon specific implementations of the system. For example, if the signals Fa, Fb - - Fn are simultaneously transmitted at different frequencies, the signal processing circuits 50 will perform the requisite frequency multiplications or divisions to attain signals that are representative of the received signals and are reduced (in pairs) to common frequencies, to enable phase comparison. Such pairs of signals are applied through a cable 52 to phase comparators 54. Functionally, the phase comparators 54 provide signals that are indicative of the phase difference between signals received from the processing circuits 50. That is, signals representing the phase differences between derived signal representations of the signals Fa, Fb - - Fn are individually applied through a plurality of lines 56 to phase meters Pa through Pn.

The phase comparators 54 may take a variety of forms and may provide the phase information in various signal-represented data formats. In one somewhat-simple form of the system, a simple phase detector may be employed. In such a system, the phase meters Pa through Pn may simply take the form of common voltmeter structures.

In the operation of the system of FIG. 3, the broadcast transmission of signals Fa, Fb - - Fn results in the propagation of such signals in various patterns. Specifically of interest, as explained above, are the energy patterns provided as a ground wave from the antenna 42 to the antenna 44 and the energy which penetrates the earth's surface below the antenna 44 to produce reflections indicative of subterranean formations. As indicated above, the different frequencies of the signals Fa, Fb - - Fn result in different depths of penetration with the result that echos reflected from earth formations are variously phase displaced thereby providing the basis by which they are sensed by the present system. In that regard, it is noteworthy that the number of phase-representative signals bearing unique information is one less than the number of signals employed. Specifically, for example, the signal Fa may be considered as a reference signal from which phase departures are measured. Thus, by the utilization of three or more signals transmitted from a common antenna, depth-scale information is provided.

In addition, to the basic system as described above, certain advantages flow from the provision of a plurality of remotely-located transmitting stations. In the system of FIG. 3, a transmitter 58 transmits the signals Fa, Fb - - Fn from an antenna 60, in time-shared relationship with transmissions from the transmitter 40. Accordingly, the receiver 46 is alternately energized by signals from the transmitters 40 and 58. As a consequence of the spaced-apart relationship between the transmitters 40 and 58, the formation of interest is more effectively illuminated to provide more significant information. Essentially, the individual signals developed from the separate transmitters 40 and 58 may be summed as a total indication or, alternatively, as well known in the prior art, may be identified and individually processed on a time-share basis. Accordingly, it is readily apparent that a wide variety of possibilities exist in the implementation of systems in accordance herewith. In that regard, an illustrative system, as embodied in the mobile unit M (FIG. 1) and useful for further explanation hereof will now be considered.

Figure 4:
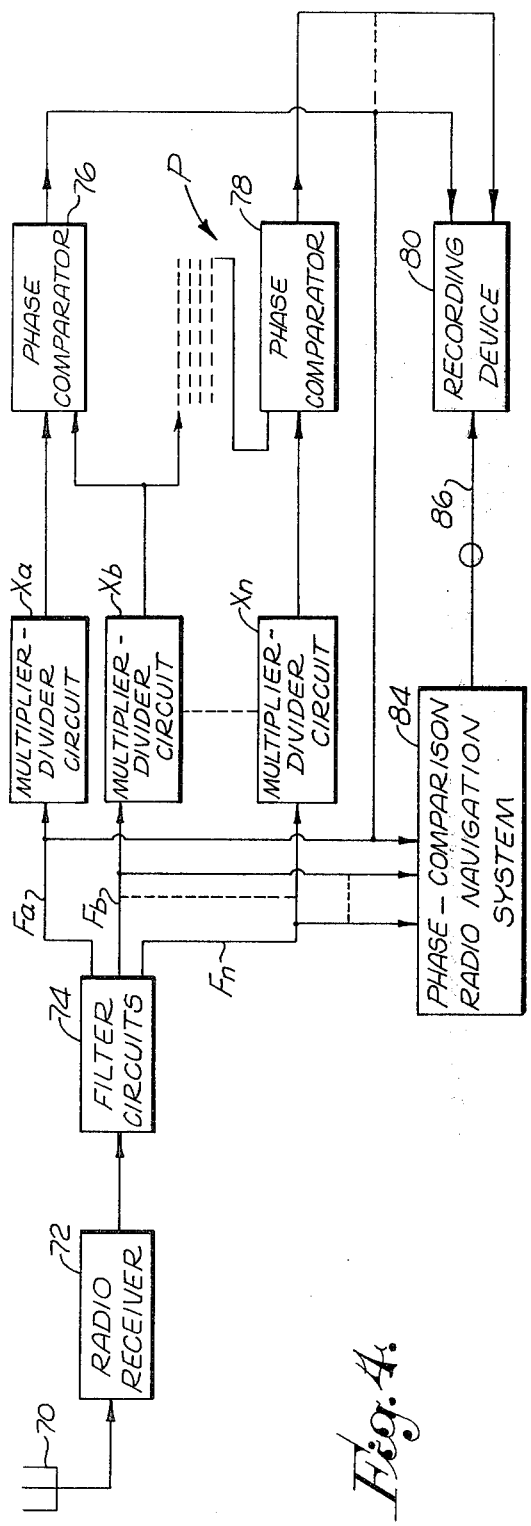
FIG. 4 is a block diagram of a portion of the system of FIG. 3 showing the components thereof in somewhat greater detail.

Referring to FIG. 4, an antenna 70 is provided in association with the radio receiver 72 for receiving a composite signal incorporating a plurality of individual signals Fa, Fb - - Fn. The composite signal is supplied to filter circuits 74 (which may take the form of any of a variety of active and/or passive filters) serving to separate the composite signal into individual components Fa, Fb and so on, supplied to conductors which are similarly identified Fa, Fb - - Fn. The conductors Fa, Fb and Fn carry signals to frequency-changing multiplier-divider circuits Xa, Xb - - Xn. These circuits function to reduce each of the individual signals Fa, Fb - - Fn to a frequency common with another signal. Of course, various forms of frequency dividers and multipliers are well known in the prior art and in view of the fact that the received signals are phase coherent or commensurate, their phase relationship is substantially dependent upon the propagation patterns involved.

The output signals from the circuits Xa, Xb - - Xn are applied in pairs (of similar frequency) to a set P of phase comparators. Specifically, the signals from circuits Xa and Xb are applied to a phase comparator 76 while the output from the multiplier-divider circuit Xn and that of the similar circuit Xn-1 (not shown) are applied to a phase comparator 78. As indicated, the number of phase comparator circuits employed is dictated by the number of signals processed and may vary widely with different design criteria.

The set P of phase comparators provides phase-indicative signals to a recording device 80. Specifically, the phase comparators may provide information in a variety of signal formats, e.g. analog or digital, which signals are recorded by the recording device 80. In general, as explained in detail above, the individual phase-representative indications manifest the presence of resistivity discontinuities in the earth's surface beneath the receiving station and, accordingly, afford valuable information for predicting minerals or other formation contents.

Recapitulating, the operation of the system of FIG. 4 involves the transmission of a plurality of low-frequency signals, which are of different frequency and which, accordingly, penetrate the earth to different depths. Reflections from the earth-penetrating signals (as well as the ground-wave signals) are then received, recognizing that the presence of echos in a signal results in a phase displacement. The signals, as described, are reduced to a common frequency, then phase compared to provide data representative of the subterranean formation. As described above, the utilization of a plurality of remotely-located transmitters affords improved illumination of the formation of interest.

In addition to improving the illumination, the spaced-apart transmitters also afford positional information in accordance herewith for identifying the position of the mobile unit M, carrying the system of FIG. 4. Specifically, a phase-comparison radio navigation system 84 is connected to receive the independent signals Fa, Fb - - Fn. The system 84 may take any of a variety of well known forms of radio navigation systems and, as illustratively disclosed, utilizes phase information from the signals received from spaced-apart transmitters to derive positional information. Specifically, the system may be in accordance with units known as "Decca" navigational systems and may be constructed to embody the teachings of British Patent Specification Nos. 620,479; 665,135; 765,593; 949,480; 983,014 and 983,015.

The navigational information in signal form may be provided from the system 84 through a cable 86 to the recording device 80 for correlation with geological data provided from the phase comparators, e.g. comparator 76, and also recorded by the recording device 80. Again, various structures may be employed as the recording device 80 utilizing such mediums as magnetic tape, for example.

Figure 5:
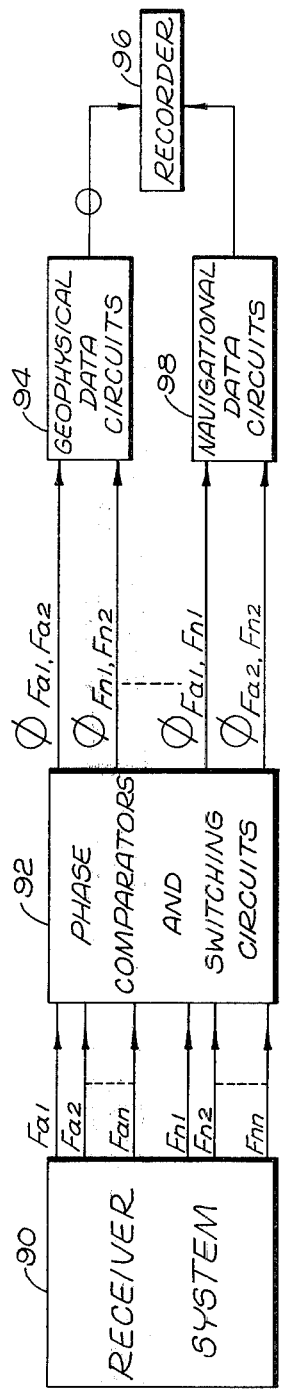
FIG. 5 is a block diagram of an alternative component portion of the system of FIG. 3.

It is to be recognized that in the system of FIG. 4, not only may various implementations be utilized but components may be more extensively time-shared between the phase comparison radio navigation system 84 and other components as represented. For example, the system may utilize a large number of signals which are provided from spaced-apart transmitting stations. Signals received from the same station are phase compared to provide geophysical information while signals received from different stations are phase compared to provide navigational information. Specifically, as shown in FIG. 5, a receiver system 90 provides a plurality of separate signals which are components of the composite signal received from several transmitting stations. Specifically, a first family of signals $Fa1$, $Fa2$ - - $Fan$ are received from a first transmitting location. Other transmitting locations transmit other similar families of signals, including the final family of signals $Fx1$, $Fx2$ and $Fxn$. Essentially, the signals $Fa1$ and $Fx1$ though transmitted from different locations are of the identical frequency and are functionally phase locked. Similar relationships exist for other similarly related signals.

The signals from the receiver system are applied to phase comparators and switching circuits as represented by a block 92 which selectively phase compares various of the signals to derive either geophysical data or navigational data. Specifically, for example, the circuits of block 92 phase compare the signals $Fa1$ and $Fa2$ (same source) as described in detail above to provide a phase signal indicative of geophysical data which is applied to the geophysical data circuits 94 for further processing prior to recording by the recorder 96. Somewhat similarly, signals $Fx1$ and $Fx2$ (different sources) may be compared to provide a phase signal which is also indicative of geophysical data.

The positional information is provided by comparing the phase of signals provided from different transmitting locations. Specifically, for example, the signals $Fa1$ and $Fx1$ may be compared to provide a positional signal which is applied to navigational data circuits 98 subsequently to be recorded by the recorder 96. Thus, the components within the block 72 may be variously time shared to accomplish the desired phase comparisons either of signals from two different transmitting stations (for positional information) or from a single transmitting station (for geological information).

In view of the widely variant possibilities of implementing the present system, it is to be understood that the scope hereof is to be as defined by the claims as follow.

What is claimed is:

1. An exploration system for indicating subterranean formations on the basis of at least one plurality of similarly-polarized, low-frequency radiated commensurate signals of respectively different frequencies radiated from a single transmitting station, comprising:

receiver means for sensing said radiated signals of different frequencies and having a frequency of less than 450 kilohertz, as sensed signals, at a location above a formation of interest;

means for processing said sensed signals of different frequencies as sensed by said receiver means to provide a plurality of electrically phase-comparable signals; and means for electrically phase comparing said phase-comparable signals to provide at least one manifestation of phase difference as in indication of the medium through which said commensurate signals are transmitted and accordingly said formation of interest.

2. A system according to claim 1 further including at least one stationary transmitter means for radiating said plurality of commensurate transmitted signals in phase-locked relationship from a location remote from said receiver means.

3. A system according to claim 2 wherein said transmitter means comprises a plurality of spaced-apart transmitter stations, each for transmitting a plurality of said commensurate signals.

4. A system according to claim 2 wherein said transmitter means provides at least three phase-locked commensurate, radiated signals, each of a different frequency.

5. A system according to claim 1 wherein said situs unit further includes a mobile unit for carrying said unit system to provide different indications.

6. A system according to claim 1 including a plurality of stationary transmitter means for simultaneous transmission of said commensurate signals, and further including means for receiving said radiated signals to provide position information indicative of the position of said receiver means.

7. A system according to claim 1 wherein said phase-comparable signals are processed by said means for processing, comprising a converter means to provide phase-comparable signals of a common frequency.

8. A system according to claim 6 further including means for correlating said position information and said indication of said formation of interest.

9. A method of geophysically exploring a formation of interest, comprising the steps of:
simultaneously transmitting from at least one radio transmitter located at a single transmitting station, a plurality of commensurate, similarly-polarized, phase-locked radiated signals each having a different frequency under 450 kilohertz;
sensing said plurality of said phase-locked radiated signals of different frequencies at a plurality of locations above said formation of interest and removed from said radio transmitter to provide a plurality of sensed signals;
phase comparing said plurality of sensed signals at each location to provide at least one phase representative signal for each location to indicate the medium through which said sensed signals are transmitted; and
manifesting said phase representative signals as an indication of said formation of interest.

10. A method according to claim 9 wherein said phase comparing includes the step of converting said sensed signals to a common frequency and said step of sensing includes sensing radiated signals from at least two spaced-apart radio transmitters which signals are of at least three different frequencies.

* * * * *